United States Patent [19]

Arvidsson

[11] 4,042,138
[45] Aug. 16, 1977

[54] GARBAGE CONTAINER CARRIER

[76] Inventor: Jens Arne Krister Arvidsson, Illervagen 4 B, S-612 00 Finspang, Sweden

[21] Appl. No.: 700,350

[22] Filed: June 28, 1976

[51] Int. Cl.² .................................................. B65G 65/04
[52] U.S. Cl. ........................................ 214/314; 214/515
[58] Field of Search .............. 214/302, 303, 314, 312, 214/502, 515; 298/11, 12, 22 P, 23 R

[56] References Cited

U.S. PATENT DOCUMENTS

| | | | |
|---|---|---|---|
| 1,985,169 | 12/1934 | Howell et al. | 214/515 |
| 2,027,421 | 1/1936 | Eisenberg, Jr. | 214/515 |
| 2,653,845 | 9/1953 | Benjamin | 298/23 R |
| 2,665,938 | 1/1954 | McCrossen | 214/515 |
| 2,943,753 | 7/1960 | Keys | 298/23 R |
| 3,096,894 | 7/1963 | Proler et al. | 214/515 |
| 3,362,552 | 1/1968 | Thiele | 214/515 |

Primary Examiner—Lawrence J. Oresky
Attorney, Agent, or Firm—Young & Thompson

[57] ABSTRACT

A garbage container is placed on the dumping body of a two-wheel trailer between the sideboards of the dumping body. A jack is provided to raise the front end of the container relative to the dumping body. Four legs are slidably mounted in sleeves secured to the sides of the container and are located outside the sideboards of the dumping body to be raised between lower and upper positions and locked when desired, the arrangement permitting one person alone to put the container onto the dumping body or therefrom and to empty the container. The legs are provided with feet which may be adjusted and locked in an upper position in which they engage the dumping body and lock the container thereto.

4 Claims, 8 Drawing Figures

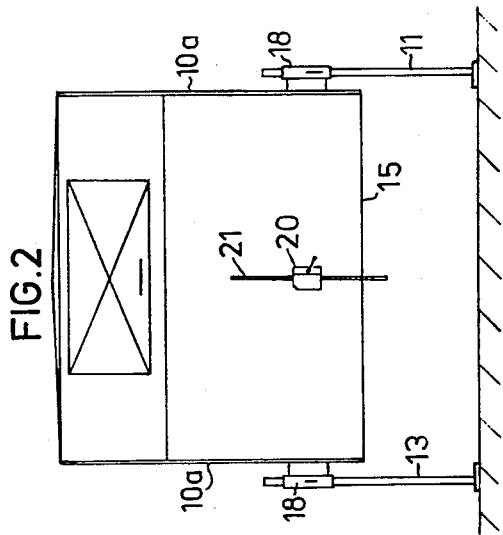
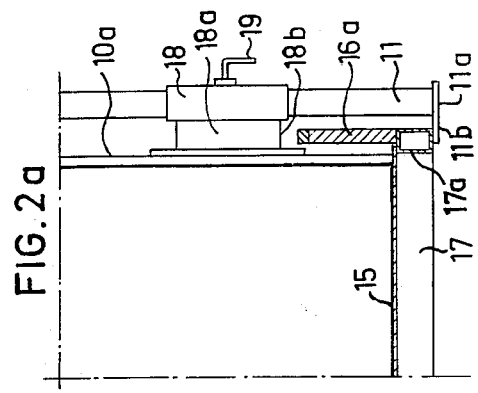
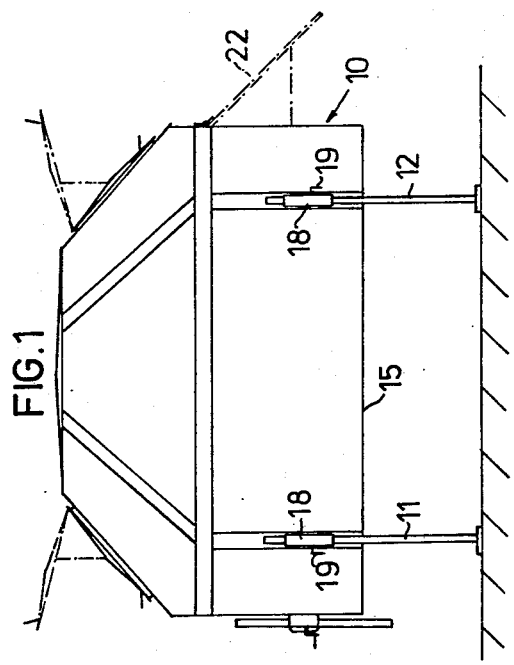
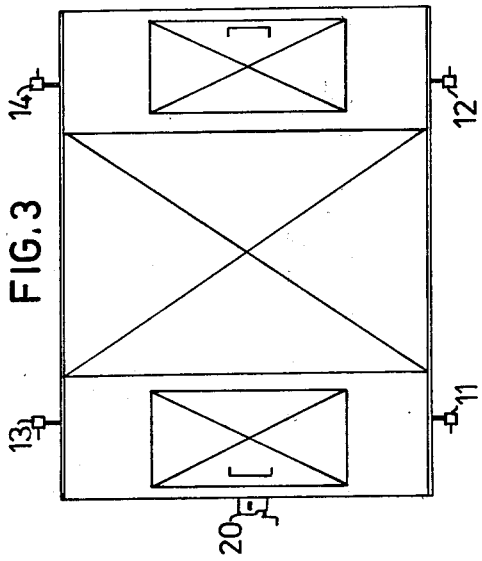

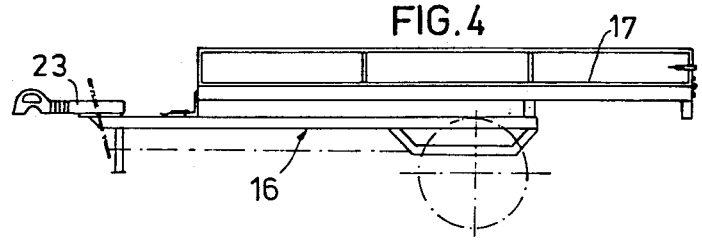
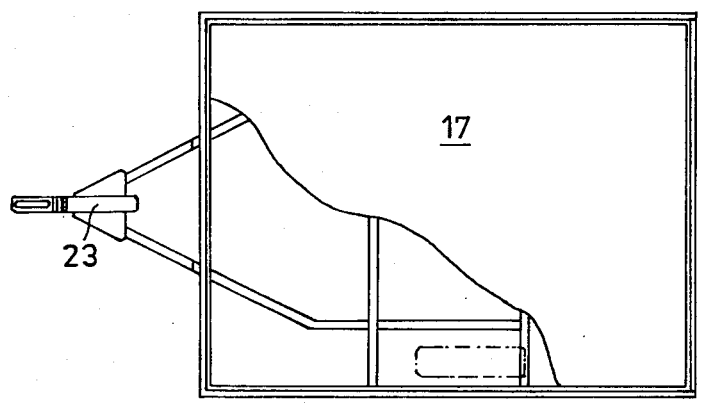

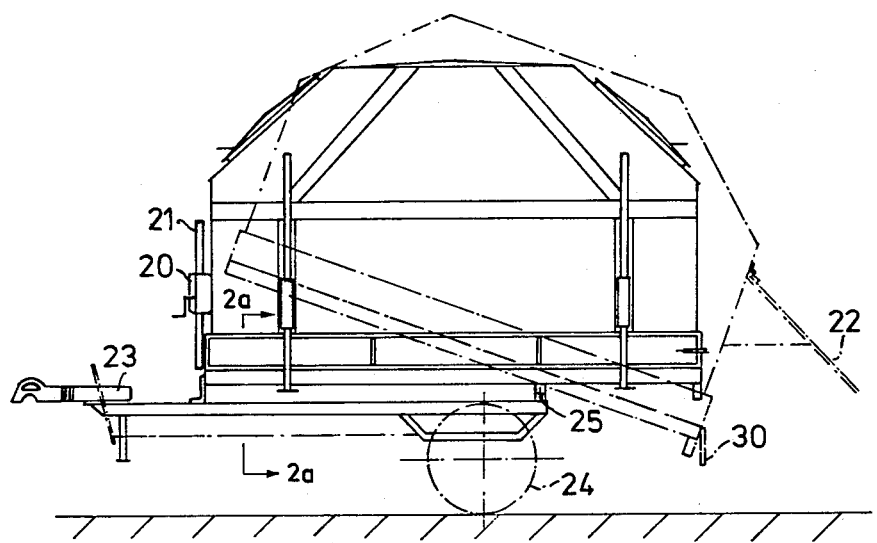
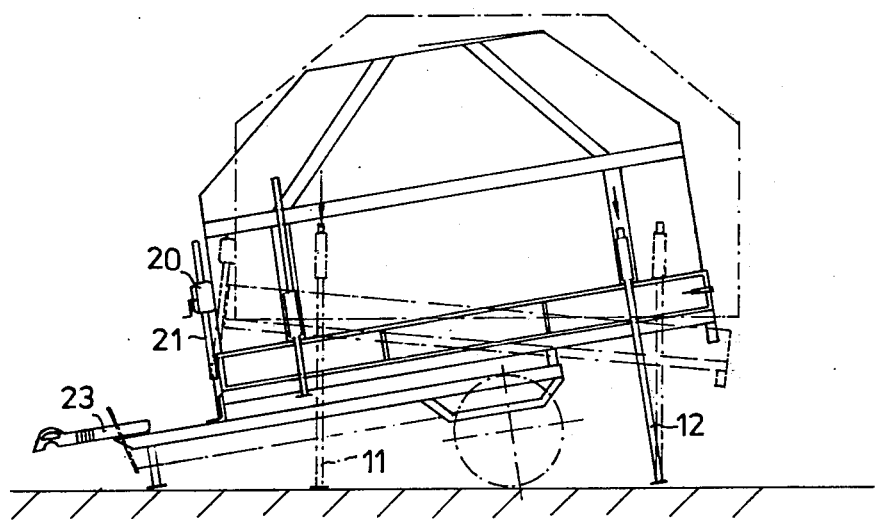

GARBAGE CONTAINER CARRIER

In the collection and transport of refuse and other garbage, refuse containers are used. These containers are capable of being set up at collection points for filing with refuse, and are thereafter intended to be transported to a refuse dump.

To keep costs down, relatively large refuse containers are used which, due to their size, cannot be transported by lighter vehicles than lorries.

The present invention has for its object to accomplish relatively cheap and easily handled apparatus for the collection, transport and dumping of refuse. The apparatus of the invention is of such a nature that a passenger car, towing a trailer which is easy to attach and remove from the car, can be used as the transporting vehicle. The apparatus is also of such a nature that the container can be handled by one man alone.

According to the invention, there is provided a transportable refuse container which is removably mounted on a two-wheel trailer provided with a dumping body which can be tipped in relation to the chassis of said trailer and a towbar intended to be coupled to a towing vehicle, the rear end of the container being provided with a door which makes it possible to empty the container by tipping it in a backwards direction, said container being provided with a forward pair and rear pair of supporting legs which can be raised and lowered and locked in vertical guiding sleeves attached to the sides of the container so that the legs can be adjusted to a length to support the container at a free height above the dumping body when the trailer is to be positioned under or removed from under the container, characterized in that the dumping body has sides, the rear side being movable to permit opening of the container door said container being held by the sides against movement on the dumping body, said guiding sleeves for the legs being supported by brackets, the inner end of each said bracket being attached to the container and mounted above the upper edge of the underlying side of the dumping body and supporting the sleeve in a position beyond said side, the forward end of the container capable of being lifted by means of a jack which is mounted between the forward end of the container and the chassis of the trailer so that the backward tipping of the container can be effected during simultaneous tipping of the dumping body.

An embodiment of the apparatus according to the invention is shown by way of example, on the attached drawings, wherein:

FIG. 1 is a side elevation of the refuse container itself, set up on the ground, FIG. 2 is a front elevation of the refuse container, FIG. 2a is a detail sectional view along line 2a—2a in FIG. 6, FIG. 3 is a plan view of the refuse container, FIG. 4 is a side elevation of a trailer with dumper body for transporting the refuse container in FIGS. 1-3, FIG. 5 is a plan view of the trailer, FIG. 6 is a side elevation of the refuse container mounted on the trailer and shown in a substantially horizontal transporting position by full lines and by chain lines in a backwardly tipped position caused by tipping the body, FIG. 7 shows in full lines the trailer with the container in a forwardly tipped position, and in chain lines a position where the body and container are tipped backwardly with the help of the jack, while retaining the forwardly tipped position of the trailer chassis.

When the refuse container 10 according to FIG. 1 is set up on the ground on its supporting legs 11, 12, 13, 14 its bottom 15 will be at a height above the ground sufficiently large for the trailer 16 in FIG. 4 with its dumping body 17 to be driven in under the container. The supporting legs are displaceable in sleeves 18 attached to the sides of the container and provided with locking levers 19 which can be used for locking the legs or letting the container 10 be slowly lowered to the desired height, as may be seen from below, or to allow free displacement of the legs to the required position. The sleeves 18 are at a predetermined distance outside the sides 10a of the container, as shown in FIGS. 2 and 2a, so that the legs go free of the sides 16a of the trailer. The sleeves 18 are secured to the outer end of brackets 18a secured to the sides of the container and having their lower edge 18 b (FIG. 2a) at such a height above the bottom 15 of the container that the brackets will extend freely over the sides 16a of the trailer in the position shown in FIGS. 6, 7 and 2a. The innerend 11b of the respective foot plate 11a then engages the underside or bottom edge 17a of the dumping body to lock the container on the trailer.

When the container is to be carried by a trailer, the trailer is backed in under the container between its supporting legs (FIG. 7). The locking levers for legs 11, 13 are loosened so far that the forward end of the container can be slowly lowered to the body 17. The levers 19 are then loosened on legs 12, 14 so that the rear end of the container is lowered onto the body.

At the refuse dump the rear door 22 of the container is opened when the rear board 30 is dropped, and the container is emptied by tipping backwards, which takes place with the help of a jack 20 and rack 21 at the front end of the container (FIG. 6). In the example shown, the jack is attached to the container, and the lower end of the rack is removably attached to the trailer chassis. Alternatively, the jack can be carried by the trailer, and the rack can be attached to the container. The container can be attached to the dumping body by means of jack 20 and, further, it is kept in place by the sideboards along the sides, the front and rear edges of the dumping body 17.

To remove the container from the dumping body, the procedure is to remove the trailer from the car and place it with the towbar 23 resting on a supporting foot in the usual manner so that the body slopes forwards (FIG. 7). In this position the rear supporting legs 12, 14 of the container are pushed down into contact with the ground, whereafter the jack 20 is used to lift up the front end of the container to a horizontal position (FIG. 7). In this position the front supporting legs 11, 13 of the container are pushed downwards to their setting-up position, where the legs are locked. The rear board 30 of the body is dropped, and the trailer can now be driven away leaving the refuse container in the set-up position.

It may be mentioned as a detail in this conjunction that the wheels 24 of the trailer should lie behind the middle point of the body so that the trailer is somewhat forward-heavy. The axis 25 of the body lies behind the center axis of the wheels 24.

What I claim is:

1. Transportable refuse container which is removably mounted on a two-wheel trailer provided with a dumping body which can be tipped in relation to the chassis of said trailer and a towbar intended to be coupled to a towing vehicle, the rear end of the container being provided with a door which makes it possible to empty the container by tipping it in a backwards direction, said container being provided with a forward pair and rear pair of supporting legs which can be raised and lowered and locked in vertical guiding sleeves attached to the sides of the container so that the legs can be adjusted to a length to support the container at a free height above the dumping body when the trailer is to be positioned under or removed from under the container, characterized in that the dumping body has sides, the rear side being movable from a blocking to a non-blocking position relative to said container door to permit opening of the container door, said container being held by the sides against movement on the dumping body, said guiding sleeves for the legs being supported by brackets, the inner end of each said bracket being attached to the container and mounted above the upper edge of the underlying side of the dumping body and supporting the sleeve in a position beyond said side, said legs having foot plates engaging the underside of the dumping body when the legs are adjusted and locked in an upper position to secure the container to the dumping body, the forward end of the container capable of being lifted by means of a jack which is mounted between the forward end of the container and the chassis of the trailer so that the backward tipping of the container can be effected during simultaneous tipping of the dumping body.

2. Apparatus according to claim 1, characterized by the jack being mounted on the refuse container and having a rack, the lower end of which is removably connectable to the trailer chassis.

3. Apparatus according to claim 1, characterized in that the middle point of the container between its front and rear ends lies in front of the trailer wheel axis.

4. Apparatus according to claim 3, characterized in that the axis of rotation of the dumping body lies behind the trailer wheel axis.

* * * * *